(12) United States Patent
Lavabre (10) Patent No.: US 8,827,295 B2
(45) Date of Patent: Sep. 9, 2014

(54) FRONT END DEVICE FOR A VEHICLE WITH A SINGLE STEERED FRONT WHEEL AND VEHICLE EQUIPPED WITH SUCH A FRONT END DEVICE

(75) Inventor: Vincent Lavabre, F-Balma (FR)

(73) Assignee: EXCENT France, Colomiers (FR)

( * ) Notice: Subject to any disclaimer, the term of this patent is extended or adjusted under 35 U.S.C. 154(b) by 0 days.

(21) Appl. No.: 13/811,145

(22) PCT Filed: Jul. 15, 2011

(86) PCT No.: PCT/FR2011/051700
§ 371 (c)(1),
(2), (4) Date: Mar. 8, 2013

(87) PCT Pub. No.: WO2012/010784
PCT Pub. Date: Jan. 26, 2012

(65) Prior Publication Data
US 2013/0161925 A1 Jun. 27, 2013

(30) Foreign Application Priority Data
Jul. 22, 2010 (FR) ..................................... 10 55986

(51) Int. Cl.
*B62K 25/24* (2006.01)
(52) U.S. Cl.
CPC .................................... *B62K 25/24* (2013.01)
USPC ........................................................ 280/277
(58) Field of Classification Search
CPC ......... B62K 25/12; B62K 25/22; B62K 25/24
USPC ........................................ 280/276, 277, 279
See application file for complete search history.

(56) References Cited

U.S. PATENT DOCUMENTS 6,910,702 B1 * 6/2005 Hals .............................. 280/286
7,857,333 B2 * 12/2010 Contarino .............. 280/124.111

FOREIGN PATENT DOCUMENTS

EP 1104738 A2 6/2001
EP 1270391 A2 1/2003

* cited by examiner

*Primary Examiner* — Kevin Hurley
(74) *Attorney, Agent, or Firm* — Birch, Stewart, Kolasch & Birch, LLP (57) ABSTRACT

A front end device (1) for a vehicle comprising:
  a steering shaft (2) capable of being connected to a steering column (3) of the chassis of the vehicle by a connection having a degree of freedom in rotation,
  an upper fork crown (4) connected to the steering shaft,
  a lower fork crown (5) connected to the steering shaft,
  an upper fork arm (6a, 6b) fixed to said upper and lower fork crowns,
  a lower fork arm (7a, 7b), connected to the upper fork arm, by means of a deformable parallelogram-type connection, by means of one upper middle arm (8) and two lower middle arms (9a, 9b), articulated at their two ends on said upper fork arm and the lower fork arm, respectively,
  a single steered front wheel (10), rotatably mounted on the lower fork arm,
  suspension means (11) providing a damped elastic connection between the lower fork arm and the upper fork arm,
  the articulated upper middle arm (8) and the articulated lower middle arm (9a, 9b) being arranged below the lower fork crown (5) and extending to the front of said upper fork arm.
Vehicle equipped with such a front end device.

20 Claims, 5 Drawing Sheets

FRONT END DEVICE FOR A VEHICLE WITH A SINGLE STEERED FRONT WHEEL AND VEHICLE EQUIPPED WITH SUCH A FRONT END DEVICE

The present invention relates to a front end device for a vehicle comprising:
- a steering shaft capable of being connected to a steering column of the chassis of the vehicle by a connection having a degree of freedom in rotation,
- an upper fork crown connected to said steering shaft,
- a lower fork crown connected to said steering shaft,
- at least one upper fork arm, fixed to said upper and lower fork crowns,
- at least one lower fork arm, connected to said at least one upper fork arm, by means of a deformable parallelogram-type connection, by means of at least one upper middle arm and at least one lower middle arm, articulated at their two ends on said at least one upper fork arm and at least one lower fork arm, respectively,
- a single front steered wheel rotatably mounted on said at least one lower fork arm,
- suspension means providing a damped elastic connection between said at least one lower fork arm and said at least one upper fork arm.

Such front end devices may be used in two-wheeled or three-wheeled vehicles having a single front steered wheel, in particular motorcycles or motorized tricycles. The present invention also relates to vehicles provided with such a front end device.

The prior art teaches front end devices: for example telescopic forks are known which do not come within the field of application of the present invention and which have the following drawbacks:
- they are subjected to significant flexural stresses, in particular during the braking phase,
- there are no demultiplication kinematics and the hydraulic system is controlled at a high speed leading to emulsion and significant heating of the fluid, resulting in variable viscosity and variable shock absorption,
- they bottom out easily during the braking phase, reducing the capacity of the suspension.

Also known are oscillating arms with shock absorbers which do not come within the field of application of the present invention and which in turn have the following features:
- they demultiply the suspension, eliminating or limiting brake dive, largely resolving the drawbacks of a telescopic fork but resulting in other drawbacks such as:
- the steering shaft is not directly connected to the handlebar and the oscillating arm does not rotate, resulting in the use of a coupler, and the use of a rotating hub leading to more complex steering.

Also known are combinations of an oscillating arm mounted on the steering column which do not come within the field of application of the present invention and which in turn have the following features:
- they largely resolve the problems of the oscillating arm with a shock absorber as described above, except where it concerns the positioning of the water radiator and the passage of the exhaust circuit which remain awkward to implement, but result in other drawbacks such as:
- excess weight, steering inertia,
- the shock absorber operates directly and without demultiplication, but without absorbing the load in flexion,
- the wheelbase of the vehicle varies in the event of compression.

Parallelogram forks are thus known, having the following features:
- they also largely resolve the problems caused by the telescopic fork but result in other drawbacks, such as:
- for the required deflection of the front suspension, the size and the weight of the non-suspended elements increase, limiting the fork performance,
- the trim adjustment is generally not able to be separated from the adjustment of the suspension,
- the parallelogram fork does not permit the mounting of a conventional fairing.

Such a type of fork is disclosed in the document EP 1 270 391 or the document EP 1 104 738 which relates to a guide for the front wheel of a motorcycle comprising:
- a fork with two branches connected together by an upper fork crown and a lower fork crown,
- a steering head fixed to the front frame and to which the fork crowns are connected in rotation,
- an upper middle arm and two lower middle arms of which the front ends are pivot-connected to the fork branches,
- two couplers pivot-connected to the rear ends of the upper middle arm and two lower middle arms and as such forming wheel supports, the middle arms and the couplers forming two identical articulated parallelograms,
- a resilient strut which bears against one of the middle arms and the upper fork crown,
- the upper and lower middle arms being arranged approximately perpendicular to the fork branches and the resilient strut being in the steering head, concentric to the axis of rotation of the steering and bearing against the upper arm.

According to the technology disclosed in the documents EP 1 270 391 or EP 1 104 738, due to the arrangement of the shock absorber strut in the steering column, the upper and lower middle arms have to be arranged to the rear of the couplers and below the lower fork crown. This technology has the drawbacks of the presence of greater non-suspended masses, and the space required between the lower fork crown and the front wheel; moreover, the fork branches are relatively long which limits the options of arranging the brake caliper.

The subject of the present invention is to remedy said drawbacks. More specifically, the invention relates to a front end device for a vehicle as defined above, characterized in that said at least one upper articulated middle arm and lower articulated middle arm are arranged below the lower fork crown and extend to the front of said at least one upper fork arm.

The solution of the invention which maintains the use of fork crowns and a steering column, i.e. the use of a conventional front "cycle part", whilst proposing a parallelogram suspension lowered toward the wheel and advantageously in the closest possible position thereto, for example substantially in the region of the tire, thus provides a compact suspension system minimizing the non-suspended mass. Thus the center of gravity of the suspension system is lowered, which at the bottom joins the center of gravity of the vehicle, for example of a motorcycle. The device according to the invention thus makes it possible to maintain the stability of the motorcycle, providing an advantage relative to parallelogram forks of the prior art. Moreover, the combined front arrangement of the middle arms makes it possible to open up the space between the lower fork crown and the front tire, which advantageously guarantees a deflection of the front suspension of the conventional type and also a correct central passage for a flow of cooling air for the engine arranged behind the front end. Further advantages are obtained from the particularities defined below. Due to its ability to be mounted on a conventional steering column, the front end device according to the invention may be adapted to replace front end devices mounted on existing vehicles, after approval of the modification by the relevant authorities, if required.

According to an advantageous feature, the pivot pins of said at least one upper middle arm and lower middle arm on said at least one upper fork arm are arranged below the lower fork crown.

Thus all of the middle arms forming the deformable parallelogram are located below the lower crown and in front of the upper fork arm(s), reducing in the best possible manner the non-suspended mass of the front end.

According to an advantageous feature, the suspension means comprise at least one shock absorber of the gas or spring type, arranged in front of said at least one upper fork arm, and of which one lower end is connected to said at least one upper middle arm.

Said feature which releases the suspension means in front of the upper fork arms, whilst making said upper fork arms cooperate with the upper middle arm, provides a great freedom for positioning the lower fixing of the shock absorber(s), thus permitting said shock absorbers to be lengthened in order to modify the law of shock absorption providing, for example, an optimized shock absorption path, advantageously in the order of half the deflection of the front suspension.

According to an advantageous feature thereof:
said at least one upper middle arm is single and in one piece, and
said suspension shock absorber is single and arranged in the plane of the single front wheel.

According to an advantageous feature of the above, the upper end of said single suspension shock absorber is connected in the area of the upper fork crown.

Said features provide a very high level of compactness of the front end device according to the invention due to the combined arrangement of the parallelogram below the lower fork crown, and the shock absorber extending to the front of the upper fork arms and thus of the steering column, advantageously between the upper fork crown and the upper middle arm.

According to an advantageous feature, the pivot pin of said at least one upper middle arm on said at least one lower arm is adjacent to the tire of the single front wheel.

Said feature makes it possible to minimize the non-suspended masses which make up the lower fork arms, reducing their length to a minimum, namely substantially the length of the radius of the front wheel when the upper middle arm is one piece with a part thereof joining the right and left lower fork arms; moreover, it permits the mounting of a fairing of the conventional type: this is due to the opening up of the space located above the parallelogram, thus permitting the positioning of a fairing of conventional size.

According to an advantageous feature, the single upper middle arm adopts a U-shape of which the free ends of the branches of the U-shape are articulated on the lower parts of the upper arms below the lower fork crown and of which the base of the U-shape is articulated on the upper ends of the lower fork arms.

This feature provides an optimized structure for a single upper middle arm, making it possible to provide good rigidity to the suspension whilst providing the possibility of a single suspension shock absorber in engagement with the base of the U-shape which joins the right and left parts of the suspension.

According to an advantageous feature, two upper fork arms, right and left, are fixed to the two lateral ends, right and left, of the two upper and lower fork crowns, respectively, and in which two lower fork arms, right and left, arranged on both sides of the single front wheel, are respectively connected to said two upper fork arms by said deformable parallelogram connection which comprises a single upper middle arm, in one piece, and two disassociated lower middle arms, right and left.

This feature proposes a front end device which is advantageously symmetrical relative to the plane of the wheel and of the steering shaft, in order to balance the forces to which the front end is subjected.

According to an advantageous feature, said two lower disassociated middle arms, right and left, are respectively arranged on both sides of the single front wheel and, according to an advantageous feature, the joints located at the two ends of said disassociated lower middle arms, right and left, are respectively arranged on the right-hand side and the left-hand side of the single front wheel, a projection of the joints of the right-hand lower middle arm on the joints of the left-hand lower middle arm, in a direction parallel to the axis of rotation of the front wheel, intercepting said wheel.

Said feature, taken in combination with an upper middle arm of which the front pivot pin is adjacent to the tire of the front wheel, provides maximum compactness of the front end device according to the invention.

According to an advantageous feature, the front end device according to the invention further comprises means for adjusting the distance between the joints of said at least one upper middle arm and said at least one lower middle arm on said at least one upper fork arm, on the one hand, and the lower fork crown, on the other hand.

This feature permits an adjustment of the distance between the lower fork crown and the axis of the front wheel, such an adjustment being possible independently of the adjustment of the shock absorption. The position of the deformable suspension parallelogram below the lower fork crown permits such an adjustment, the deformable parallelogram being disassociated from the fork crowns.

According to an advantageous feature, said at least one upper fork arm adopts a cylindrical shape in engagement in the upper and lower fork crowns, and of which the fixing position relative thereto is adjustable along at least part of the cylindrical shape.

This feature permits an adjustment of the distance between the lower fork crown and the front wheel shaft, with a displacement of the upper fork arm relative to the fork crowns.

According to an advantageous feature, the cylindrical shape of said at least one upper fork arm has a circular cross section in engagement by being clamped in two housings formed in the two upper and lower fork crowns, respectively, of which the section is complementary to the circular cross section of the upper fork arm.

This feature is a known feature of a front end with a conventional telescopic fork and results in a possible interface with the front end devices already mounted on existing vehicles.

According to an advantageous feature, the upper end of said single suspension shock absorber is connected to the upper fork crown by a connection comprising at least one degree of freedom in translation permitting an adjustable position of said upper end of the shock absorber relative to the upper fork crown.

This feature makes it possible to modify the vehicle trim without modifying the shock absorption.

The invention also relates to a vehicle, characterized in that it comprises a front end device according to the invention.

According to an advantageous feature, said at least one upper middle arm and at least one lower middle arm are respectively arranged in two substantially parallel and horizontal planes when said front end device is placed in a stopped position, under load of the weight of the vehicle, known as the resting position of the front end device.

According to an advantageous feature, said at least one lower fork arm is arranged in a substantially vertical plane passing through the axis of rotation of the front wheel, when said front end device is placed in a stopped position, under the load of the weight of the vehicle, known as the resting position of the front end device.

According to an advantageous feature, said at least one upper fork arm has a cylindrical shape in engagement in the upper and lower fork crowns, and of which the fixing position relative to said fork crowns is adjustable in height in order to adjust the vehicle trim.

According to an advantageous feature, said at least one upper fork arm, said at least one lower fork arm, and said at least one upper middle arm and at least one lower middle arm, are arranged via the arrangement of their joints defining said deformable parallelogram system, such that:
  said front end device is mobile between two extreme positions:
    a first position known as the detent position, and
    a second position known as the compression position, and
  the wheelbase of the vehicle is substantially constant during the deflection of the front end device between said two extreme positions.

Further features will appear from reading the following exemplary embodiment of a front end and of a vehicle according to the invention, accompanied by the attached drawings, given by way of non-limiting illustrative example.

Figures 5A, 5B, 5C:
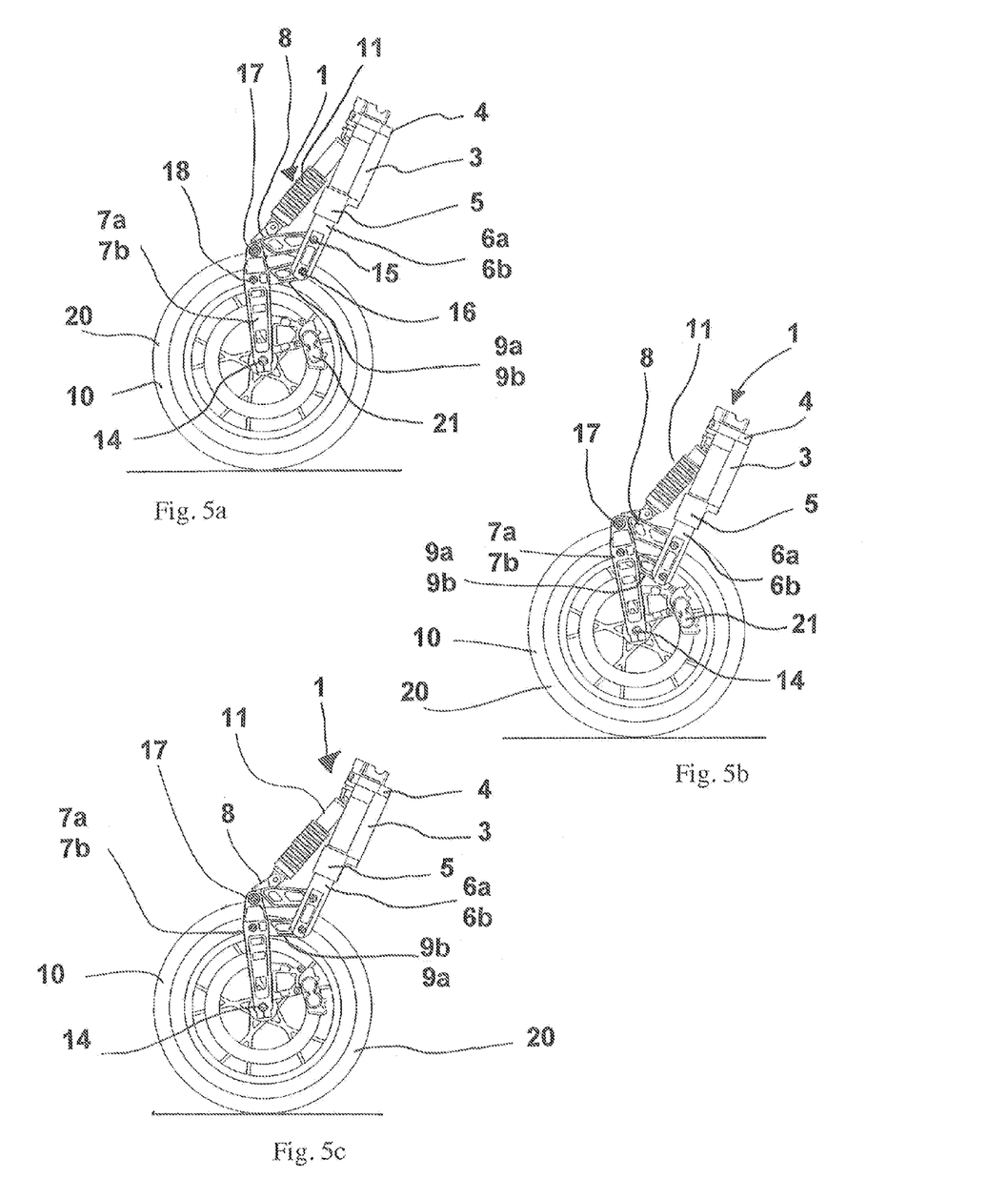
FIGS. 5a, 5b, 5c show three side views of the example according to FIG. 1, respectively in the detent abutment position, in the compressive abutment position and in the normal position.
Figures 6, 7:
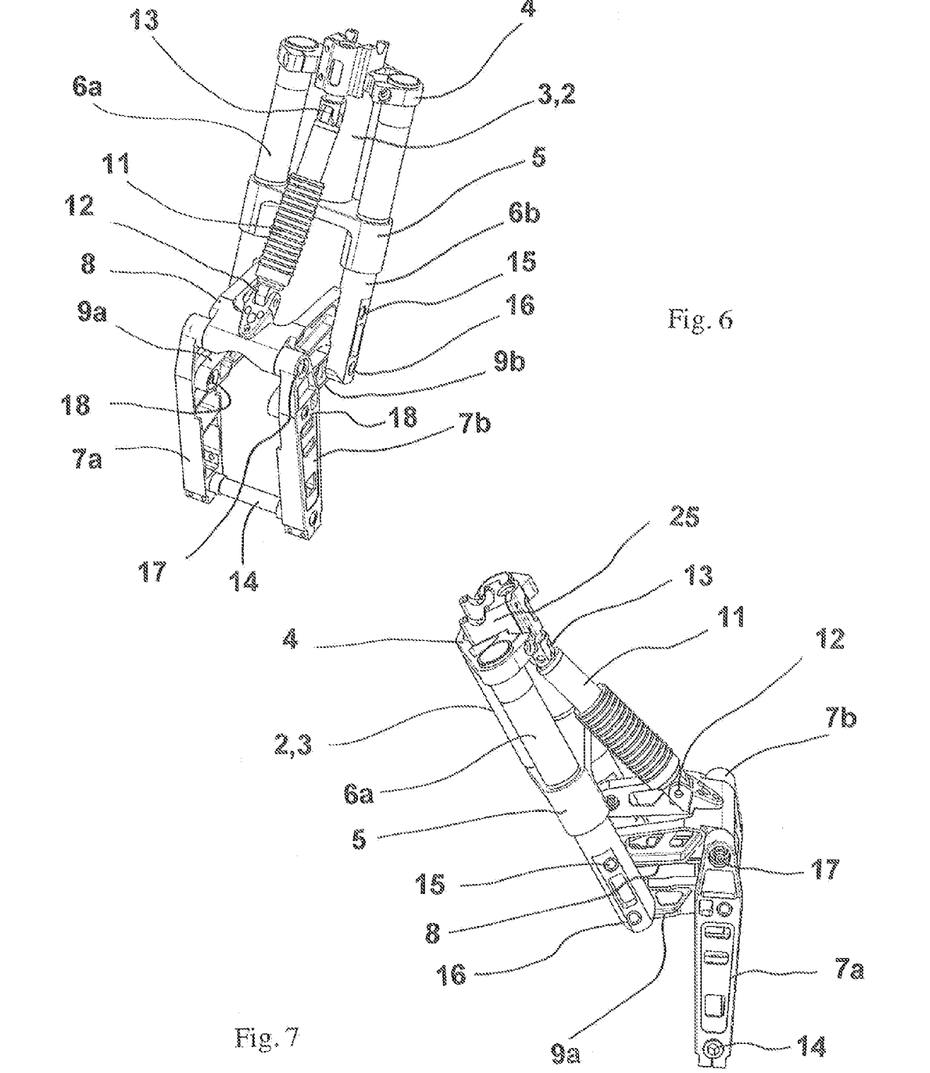
FIG. 6 shows a perspective view from the front and from above of the front end of FIG. 1 without the wheel.
FIG. 7 shows a perspective view to the side and from above of the front end of FIG. 1 without the wheel.

The front end device 1 of the vehicle shown in FIGS. 1 to 5, partially in FIGS. 6 and 7, is more particularly designed for a two-wheeled type vehicle, for example a motorcycle. It comprises:
  a steering shaft 2 capable of being connected to a steering column 3 of the chassis of the vehicle by a connection comprising a degree of freedom in rotation,
  an upper fork crown 4 connected to the steering shaft 2,
  a lower fork crown 5 connected to the steering shaft 2,
  advantageously two upper fork arms 6a, 6b, right and left, fixed to the upper 4 and lower 5 fork crowns,
  advantageously two lower fork arms 7a, 7b, right and left, respectively connected to the two upper fork arms 6a, 6b, by means of a deformable parallelogram-type connection, advantageously by means of an upper middle arm 8 and two lower middle arms 9a, 9b, articulated at their respective ends on the two upper fork arms 6a, 6b, and on the two lower fork arms 7a, 7b, respectively,
  a single steered front wheel 10, rotatably mounted in a clevis on the two lower fork arms 7a, 7b,
  the articulated upper 8 and lower 9a, 9b middle arms being arranged below the lower fork crown 5 and, in particular, in the example integrally below, whatever the position of said arms,
  suspension means 11 providing an elastic damped connection between the lower fork arms 7a, 7b and the upper fork arms 6a, 6b.

The steering shaft 2 may be a conventional steering shaft. The upper 4 and lower 5 fork crowns may also be fork crowns of the conventional type, and the mounting of said fork crowns 4, 5 with the steering shaft 2 in a steering column 3 of the chassis of a vehicle, according to a connection comprising a degree of freedom in rotation, may also be of the conventional type, for example as shown, unless described to the contrary below. Said elements are thus not described in more detail here, and the person skilled in the art will refer to said known techniques for the implementation thereof.

The two upper fork arms 6a, 6b, right and left, may, for example, consist of two rectilinear fork tubes respectively fixed laterally right and left onto the two superposed upper 4 and lower 5 fork crowns. The upper part of the upper fork arms 6a, 6b in engagement with the fork crowns 4, 5 may, for example, also be of the conventional type with upper fork tubes engaged and clamped in corresponding lateral housings of the crowns, to be fixed thereto at least by clamping. As will be explained in more detail below, the position of the upper fork arms 6a, 6b relative to the crowns 4, 5 is advantageously adjustable.

On the lower part of the two upper fork arms 6a, 6b, below the lower fork crown 5, are articulated the upper 8 and lower 9a, 9b middle arms such that the pivot pins 15, 16 corresponding to said middle arms are arranged below the lower fork crown 5, as shown in the figures. In the example shown, the joints 17, 18 of the middle arms 8, 9a, 9b on the lower fork arms 7a, 7b which are mobile relative to the upper fork arms 6a, 6b are also located below the lower fork crown 5 whatever the position of deflection of the parallelogram fork.

In the example shown, advantageously, two upper fork arms, right 6a and left 6b, are fixed to the two lateral right and left ends of the two upper 4 and lower 5 fork crowns, respectively, and two lower fork arms, right 7a and left 7b, arranged on both sides of the single front wheel 10, are respectively connected to the two upper fork arms 6a, 6b by the deformable parallelogram connection which comprises a single upper middle arm 8, in one piece, and two disassociated lower middle arms, right 9a and left 9b. The two lower disassociated middle arms, right 9a and left 9b, are respectively arranged on both sides of the single front wheel 10 and in the example substantially opposite the tire 20 of the front wheel 10.

As shown in the figures, the joints 16, 18 located at the two ends of the disassociated lower middle arms, right 9a and left 9b, are advantageously arranged respectively on the right-hand side and on the left-hand side of the single front wheel 10, either in the example in the upper area of the tire 20 and on both sides thereof, a projection of the joints 16, 18 of the lower right middle arm 9a on the joints 16, 18 of the lower left middle arm 9a according to a direction parallel to the axis 14 of rotation of the front wheel 10, intercepting said front wheel.

The middle arms 8, 9a, 9b are articulated in all the known ways to said upper 6a, 6b and lower 7a, 7b fork arms, respectively by the joints with a degree of freedom in rotation along axes parallel thereto to form the deformable parallelogram, and parallel to the axis of rotation of the front wheel 10. The joints 15, 16, 17, 18 may respectively take the form of a plain bearing, needle bearing, roller bearing or ball bearing.

The joints 15, 16 of the middle arms 8, 9a, 9b on the lower part of the upper fork arms 6a, 6b are aligned along upper fork arms, the joints 16 of the lower middle arms 9a, 9b being substantially located at the lower end of the arms 6a, 6b respectively, and the joints 15 of the upper middle arm 8 being substantially located above the joints 16.

The upper middle arm 8 advantageously adopts in the example a U-shape of which the free ends of the branches of the U-shape are articulated at 15 to the lower parts of the upper arms 6a, 6b below the lower fork crown 5, and of which the base of the U-shape is articulated at 17 to the upper ends of the lower fork arms 7a, 7b as shown in the figures.

The lower middle arms 9a, 9b each have the shape of an oblong lever-type element, substantially rectilinear, and of a length similar to that of a branch of the U-shape consisting of the upper middle arm 8, the oblong lever-type element being articulated at its two free ends at 16 and 18. The two lower middle arms 9a, 9b are assembled on the fork arms 6a, 6b, 7a, 7b to form the deformable suspension parallelogram of the front end, substantially parallel to the two branches of the U-shape, consisting of the upper middle arm 8. The two lower middle arms 9a, 9b may be identical or symmetrical relative to a plane of symmetry of the front wheel 10 passing through said front wheel.

The lower arms 7a, 7b advantageously each have an extended shape, at the lower end of which is fixed the axis of rotation 14 of the front wheel 10, and at the upper end of which is articulated the base of the U-shape consisting of the upper middle arm 8. The joints 18 of the end of the lower middle arms 9a, 9b on the lower fork arms 7a, 7b, respectively, are advantageously located below the joint 17 of the base of the U-shape consisting of the upper middle arm 8. The length of each lower fork arm 7a, 7b in the example is substantially equal to the radius of the wheel, more specifically slightly greater than said radius.

The upper middle arm 8, the lower middle arms 9a, 9b and the lower fork arms 7a, 7b may be manufactured from metal or an appropriate reinforced rigid synthetic material (carbon fibers or the like) according to any known means, for example by forging, machining, molding, etc. The front wheel 10 is rotatably mounted in the clevis, at the lower end of the lower fork arms 7a, 7b and between said fork arms according to any known means, for example by mounting a front wheel at the end of a telescopic fork, which are not described further here.

The front end device 1 shown has the advantage of permitting the dismantling of the complete front suspension without disassociating the deformable parallelogram, namely without unscrewing the joints 15, 16, 17, 18.

The front end device shown in the figures comprises a double or single brake disk system, of the conventional type, of which the brake calipers 21 are advantageously fixed to the lower fork arms 7a, 7b as shown, for example on the rear face of the arms 7a, 7b the disk(s) being fixed laterally to the wheel 10 between the lower fork arms 7a, 7b. On a conventional front end with a telescopic fork there is no longer any shock absorption when braking, causing bottoming out of the fork. With the disclosed front end device, there is little fork dive when braking, due to the parallelogram system, such a front end device 1 acting as an anti-dive system relative to a conventional motorcycle provided with a telescopic fork; this results in increased comfort with the use of a disclosed front end device 1.

The upper fork arms 6a, 6b advantageously extend below the lower fork crown 5 by a minimal length, in the example approximately up to the external diameter of the front rim which supports the front tire, in the normal operating position, defined by a front end at rest and under the load of the weight of the vehicle, as shown in FIG. 5c. Thus, a maximum circumferential space is opened up from the wheel axle for the deflection of the front brake calipers, as shown in FIGS. 5a to 5c.

Advantageously, the front end device 1 shown further comprises means for adjusting the distance between the joints 15, 16 of the upper middle arm 8 and the lower middle arms 9a, 9b, respectively, on the upper fork arms 6a, 6b, on the one hand, and lower fork crown 5, on the other hand. To this end, according to an embodiment shown, the upper fork arms 6a, 6b adopt a cylindrical shape, in engagement in the upper 4 and lower 5 fork crowns, and of which the fixing position relative thereto is adjustable along at least one part of the cylindrical shape.

In the example shown, the cylindrical shape of the upper fork arms 6a, 6b has a circular cross section, in engagement by being clamped in two housings formed in the two upper 4 and lower 5 fork crowns, respectively, of which the section is complementary to the circular cross section of the upper fork arm 6a, 6b, according to any known means, for example by fixing the fork tubes of a telescopic fork.

The adjustment of the distance between the joints 15, 16 and the lower fork crown 5, and incidentally the distance from the axle 14 of the front wheel 10 to the lower fork crown permits the adjustment of the vehicle trim without modifying the adjustment of the shock absorption, as will be explained further below with the description of an exemplary embodiment of a vehicle according to the invention. Further embodiments of this adjustment are possible, for example, by means of direct adjustment of the position of the pivot pins 15, 16 along the upper fork arms 6a, 6b, said fork arms thus being mounted in a fixed and non-adjustable manner on the fork crowns 4, 5.

As shown in the figures, the suspension means advantageously comprise a single combined spring/shock absorber 11, hereinafter referred to as the shock absorber, and arranged in the plane of the front wheel 10, of the gas or spring type, arranged in front of the upper fork arms 6a, 6b and of which one lower end 12 is connected to the upper middle arm 8, more specifically in the example at the base of the U-shape formed thereby. According to such an arrangement, the damping path of the single shock absorber 11 may be in the order of half of the deflection of the front suspension which is, in turn advantageously standard for a motor application, namely equal to approximately 110 mm.

The upper end 13 of the suspension shock absorber 11 is advantageously connected in the area of the upper fork crown 4, in the example on the upper crown 4 itself. Advantageously, the upper end 13 of the single suspension shock absorber 11 is connected to the upper fork crown 4 by a connection comprising at least one degree of freedom in translation permitting an adjustable position of the upper end 13 of the shock absorber 11 relative to the upper fork crown 4. In the example shown, the degree of freedom in translation for the adjustment of the upper end 13 of the shock absorber 11 is parallel or substantially parallel to an adjustment axis of the position of the joints 15, 16 relative to the lower fork crown 5, in the example relative to the longitudinal axis of the cylindrical shape of the upper fork arms 6a, 6b. In the example, said adjustment axes are parallel to the steering shaft. A further adjustable fixing means (not shown) of the upper end 13 of the shock absorber 11 might consist of connecting said shock absorber to a plate which in turn is fixed to the upper fork arms 6a, 6b between the upper 4 and lower 5 fork crowns, by a fixing permitting the possibility of sliding in order to adjust the blocking height of said plate between the fork crowns. The upper end 13 of the shock absorber 11 is connected by a joint to said plate in the conventional manner for a shock absorber connection.

The upper 13 and lower 12 ends of the shock absorber 11 are, in the known manner, pivotably mounted along axes parallel to the pivot pins 15, 16, 17, 18 of the deformable parallelogram.

The arrangement and the fixings of the shock absorber 11 as disclosed provide a deflection of the demultiplied shock absorber relative to the movement of the front wheel 10; the deflection of the shock absorber 11 is in fact reduced relative to that of the wheel 10, leading to a reduction in the speed, in particular the compression, of the shock absorber and thus a reduction in the operating temperature of the shock-absorbing fluid limiting the phenomenon of emulsion.

Figures 1, 2:
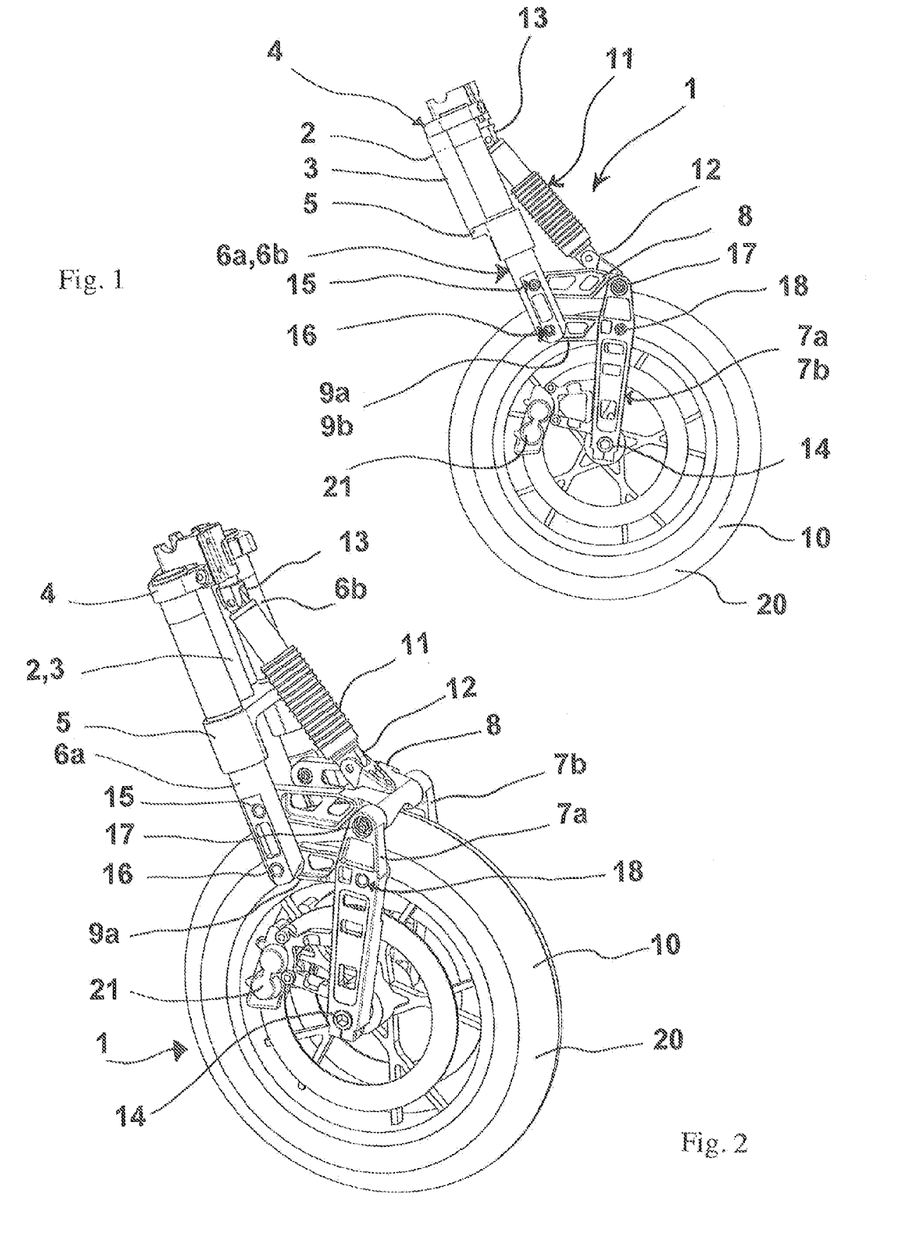
FIG. 1 shows a side view of an exemplary embodiment of a front end device according to the invention.
FIG. 2 shows a perspective view from the front and from above of the example of FIG. 1.
Figure 3:
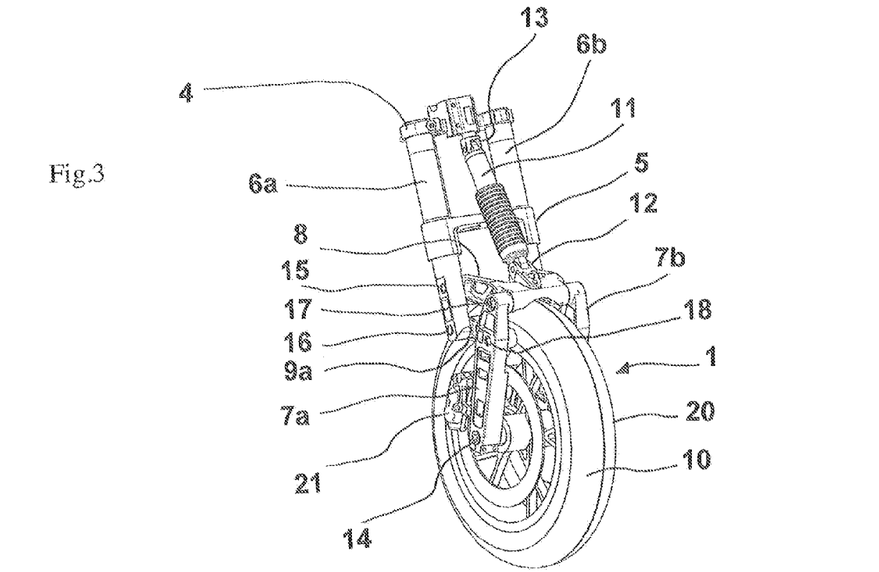
FIG. 3 shows a further perspective view from the front and from above of the example of FIG. 1.
Figure 4:
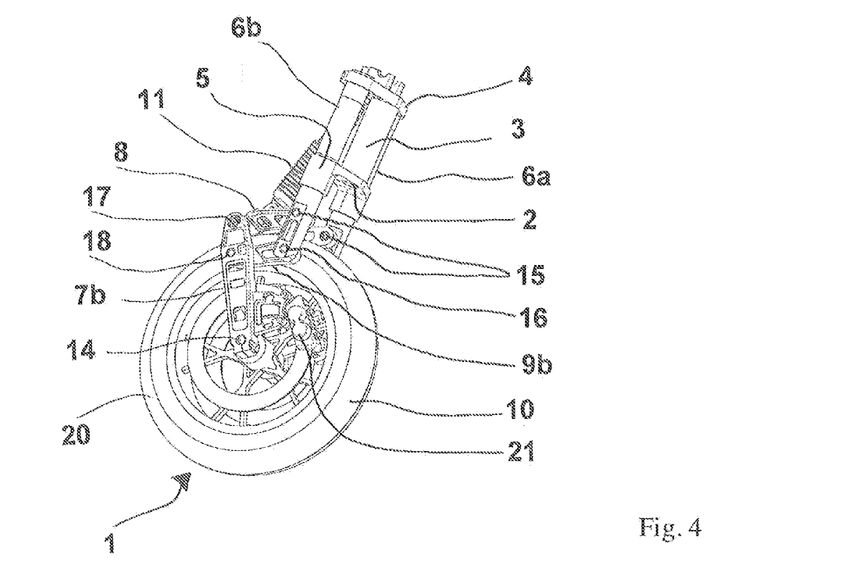
FIG. 4 shows a perspective view from the rear and from below of the example of FIG. 1.

In the example shown, the pivot pin 17 of the upper middle arm 8 on the lower fork arms 7a, 7b is adjacent to the tire of the single front wheel 10 such that a gap following the transverse profile of the tire 20 may be formed on the base of the U-shape forming the upper middle arm 8 on the wheel side, in order to open up a minimum free safety space between the middle arm 8 and the tire 20, for example as shown in FIG. 3 or 2.

In the example shown, the upper 8 and lower 9a, 9b middle arms are arranged between the upper 6a, 6b and lower 7a, 7b fork arms, said fork arms being substantially aligned in pairs in two planes parallel to the median plane of the front end passing through the wheel 10.

A handlebar (not shown) is fixed in the conventional manner on the upper fork crown 4. To this end, the fixing plate 25 for the handlebar may comprise the adjustable fixing of the upper end of the shock absorber 11 as shown in the figures.

FIGS. 5a, 5b, 5c show three positions of the front end device 1, including two in operating abutment, detent abutment (FIG. 5a) and compressive abutment (FIG. 5b). Said figures show the extreme deformations of the deformable parallelogram forming the suspension of the front end shown. The compressive abutment of the deformable parallelogram may be conferred by the compression stop of the shock absorber 11. The detent abutment of the deformable parallelogram may be conferred by the detent abutment of the shock absorber. In FIG. 5b it is observed that the branches of the U-shape forming the upper middle arm 8 and the lower middle arms 9a, 9b are substantially integrally located inside the external circumference of the tire 20. In the detent position, the lower middle arms 9a, 9b remain integrally located inside said external circumference of the tire 20. In the normal operating position, defined by a front end at rest and under the load of the weight of the vehicle, the middle arms 8, 9a, 9b are horizontal or substantially horizontal, as shown in the example in FIG. 5c.

The geometry of the front end, conferred at least in part by the middle and lower fork arms and their joints 15, 16, 17, 18 is defined according to requirements. The steering error angle is, in the conventional manner, provided by the inclination of the steering shaft relative to the vertical, the steering shaft being parallel to the longitudinal axis of the upper fork arms 6a, 6b. It is possible to provide a deviation or no deviation to the axis of rotation 14 of the front wheel 10, in the normal operating position shown in FIG. 5c. To this end, the upper fork arms 6a, 6b, the middle fork arms 8, 9a, 9b and the lower fork arms 7a, 7b are, for example, arranged such that the axis of rotation 14 of the front wheel 10 is located in the plane of extension of the longitudinal axis of the upper fork arms (no deviation), or located in front of the plane of extension of the longitudinal axis of the upper fork arms (deviation). The deflection of the deformable parallelogram defines a trajectory of the axis of rotation 14 of the front wheel 10, from the resting position, toward the compressive abutment position, and toward the detent abutment position, determined according to requirements. The deviation of the front end device described may vary along the deflection of the fork, according to the selected kinematics of the constituent elements. The upper fork arms 6a, 6b, the middle fork arms 8, 9a, 9b and the lower fork arms 7a, 7b, are advantageously arranged such that the total deflection of the fork is in the order of 110 mm, namely a substantially standard deflection. The existing parameters of the front end of an existing vehicle may be reproduced using the front end device described, so as to permit the adaptation thereof to an existing vehicle. In particular, the steering error angle and the steering error may have conventional values.

FIGS. 6 and 7 show the front end of FIGS. 1 to 5 without the wheel and without the braking systems. It is noteworthy that the front end partially shown on said figures may be mounted by being adapted to existing vehicles reusing the original front wheel and, in certain cases, for an existing vehicle with a telescopic fork for example, and the fork crowns with the steering shaft may also be reused by providing replacement upper fork arms 6a, 6b compatible with the fixing to the original crowns of the vehicle. The same applies to the axis of rotation of the front wheel.

Figure 8:
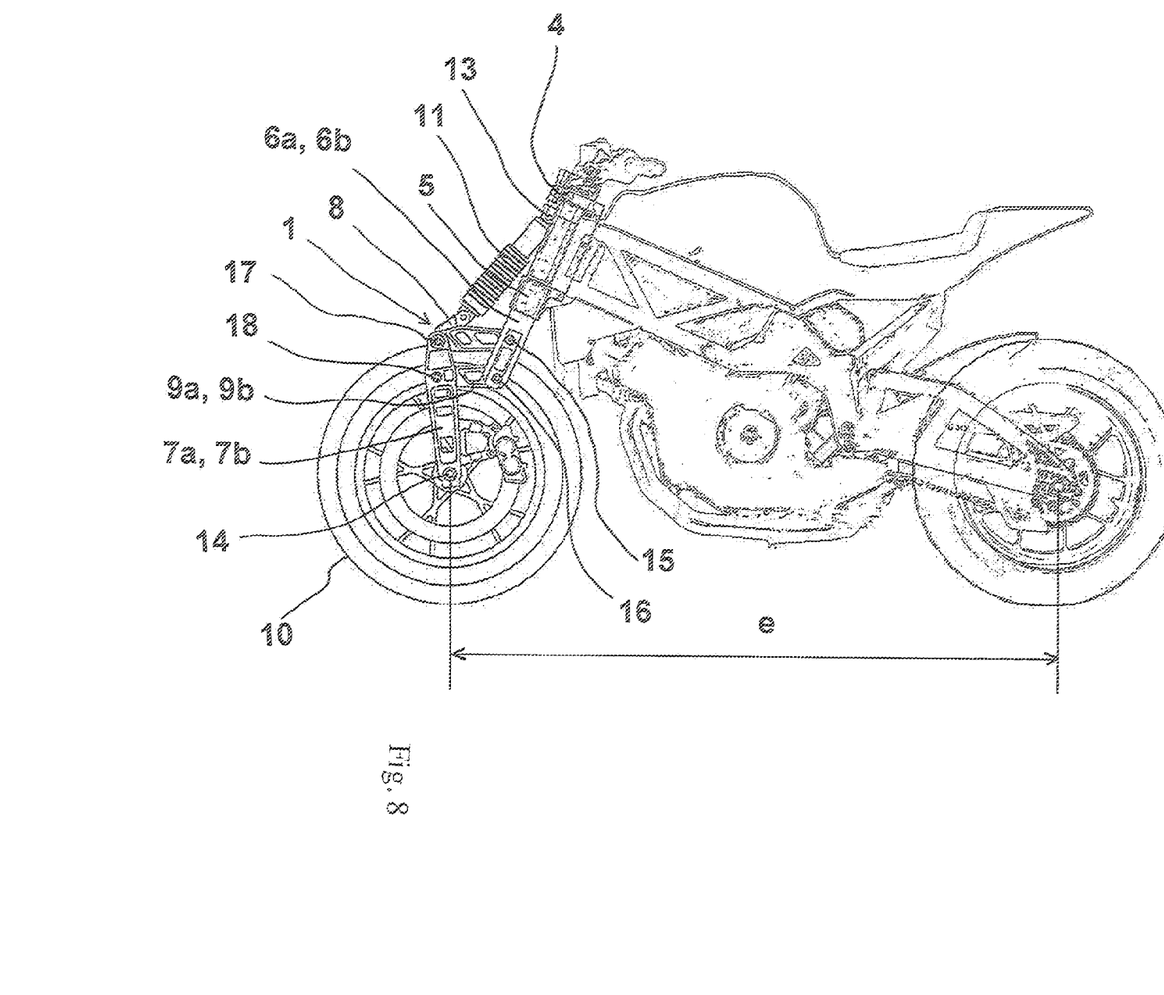
FIG. 8 shows schematically a side view of an exemplary embodiment of a vehicle according to the invention comprising a front end device according to FIG. 1.

FIG. 8 shows schematically an example of a motorcycle according to the invention on which is mounted the exemplary embodiment of the front end device 1 according to the invention, as described above by means of the FIGS. 1 to 7. The remainder of the motorcycle shown is of the known type. The motorcycle is shown in the resting position, namely stopped under the load of its own weight, the front end device being in the same position as in FIG. 5c.

As shown in FIG. 8, the upper 8 and lower 9a, 9b middle arms advantageously extend to the front of the upper fork arms 6a, 6b, such that the lower arms 7a, 7b are arranged to the front of the upper fork arms 6a, 6b. Moreover, in the example of the vehicle shown, it may be seen in FIG. 8 that the upper middle arm 8 and the two lower middle arms 9a, 9b are respectively arranged in two substantially parallel and horizontal planes when the front end device 1 is placed in a stopped position under the load of the weight of the vehicle, known as the resting position of the front end device.

As shown in FIG. 8 in the example, the lower fork arms 7a, 7b, or more specifically the longitudinal axes of said lower arms, are arranged in a substantially vertical plane passing through the axis 14 of rotation of the front wheel 10, when the front end device 1 is placed in the resting position of the vehicle defined above. In FIG. 8, said plane is slightly inclined to the front from the axis of the front wheel.

In FIGS. 1, 5a-5c and 8, in side view, it is observed that the front end advantageously defines a substantially isosceles triangle, of which the base partially consists of the upper fork arms 6a, 6b and the two sides of the lower fork arms 7a, 7b and the combined shock absorber 11, respectively, the deformable parallelogram connecting in its entirety the area of the apex of the triangle to a central area of the base. During the deflection of the front suspension, said triangle remains a substantially isosceles triangle with a base of variable length, as shown in FIGS. 5a to 5c.

The means for adjusting the distance between the joints 15, 16, respectively of the upper middle arm 8 and the lower middle arms 9a, 9b on the upper fork arms 6a, 6b, on the one hand, and the lower fork crown 5, on the other hand, as described above, advantageously make it possible to adjust the vehicle trim.

By using the combined adjustment of the position of the upper end 13 of the shock absorber 11, also as described above, said adjustment of the vehicle trim may be carried out without modifying the shock absorption and thus makes it possible to maintain the adjustment of the shock absorption when changing the vehicle trim.

Advantageously, the upper fork arms 6a, 6b, the lower fork arms 7a, 7b, and the upper middle arm 8 and the lower middle arms 9a, 9b are arranged via the arrangement of their joints 15, 16, 17, 18 defining the deformable parallelogram system, such that the front end device 1 is mobile between two extreme positions:
a first position known as the detent position, as shown in FIG. 5a, and
a second position known as the compression position as shown in FIG. 5b and
the wheelbase e of the vehicle is substantially constant during the deflection of the front end device 1 between said two extreme positions.

More specifically, on a conventional telescopic fork, during the deflection of the fork, the wheelbase of the vehicle varies as said deflection is carried out in the direction of inclination of the fork tubes fixed to the fork crowns. Thus, the axis of rotation of the front wheel is fixed to the lower end of the fork, when the fork is under tension, the wheelbase increases, and when the fork is compressed, the wheelbase is reduced; this results in variable road hold of the vehicle during this deflection of the fork, all the more dangerous when it occurs during cornering. With the front end device 1 according to the invention, as shown in FIG. 5, the deflection of the axis of rotation 14 of the front wheel 10 is advantageously carried out at least partially along a substantially vertical plane due to the arrangement described of the constituent elements of the front end; thus the wheelbase e of the vehicle varies little or not at all following the deflection of the front end, and is substantially constant at 98% of its reference value (resting position); resulting in improved road hold of the vehicle, in particular greater stability of the motorcycle during cornering and when accelerating or decelerating.

Alternatively, it is also possible to reproduce a variable wheelbase e, to the amplitude of the deflection of the fork, for example that of a conventional telescopic fork, as explained above, either at the design stage or by mounting joints 15, 16, 17, 18 on eccentrics, for example (not shown), and an appropriate adjustment thereof according to the desired trajectory of the axis of rotation 14 of the front wheel 10.

It is noteworthy that the varied trajectories of the deflection of the shaft 14 of the front wheel 10 may be adopted according to the uses of the vehicle, for example road, sport, competition. To this end, it is possible to provide an adjustable front end, for example by placing one or more joints 15, 16, 17, 18 on eccentrics (not shown) as indicated above, so as to modify the distances forming the deformable parallelogram.

It is thus possible to disassociate the reaction of the fork under tension and in compression; it is possible to obtain according to the adjustment of the eccentrics or the design of the front end, for example:
a wheelbase e which is constant in compression and a wheelbase e which slightly increases under tension: the importance of such a configuration is in racing applications of the disclosed front end device; or
a reduction of the wheelbase e in compression and a constant wheelbase e under tension.

Said modifications of the reaction of the fork are advantageously obtained by varying one of the dimensions of the parallelogram, preferably by varying the length of the lower middle arms 9a, 9b, said two parts being the most simple to manufacture and replace.

The invention claimed is:

1. A front end device for a vehicle comprising:
a steering shaft configured to be connected to a steering column of a chassis of the vehicle by a connection having a degree of freedom in rotation,
an upper fork crown connected to said steering shaft,
a lower fork crown connected to said steering shaft,
at least one upper fork arm fixed to said upper and lower fork crowns,
at least one lower fork arm connected to said at least one upper fork arm, by a deformable parallelogram connection, said connection comprising at least one upper middle arm and at least one lower middle arm articulated at their two ends on said at least one upper fork arm and at least one lower fork arm, respectively,
a single steered front wheel rotatably mounted on said at least one lower fork arm,
a suspension providing a damped elastic connection between said at least one lower fork arm and said at least one upper fork arm,
wherein said at least one upper articulated middle arm and lower articulated middle arm are arranged below the lower fork crown and extend to the front of said at least one upper fork arm.

2. The front end device as claimed in claim 1, comprising pivot pins connecting said at least one upper middle arm and lower middle arm to said at least one upper fork arm and arranged below the lower fork crown.

3. The front end device as claimed in claim 1, wherein the suspension comprises at least one shock absorber arranged in front of said at least one upper fork arm, wherein a lower end of said shock absorber is connected to said at least one upper middle arm.

4. The front end device as claimed in claim 3, wherein said at least one upper middle arm is a unitary piece and said shock absorber is arranged in the plane of the single front wheel.

5. The front end device as claimed in claim 4, wherein an upper end of said shock absorber is connected in the area of the upper fork crown.

6. The front end device as claimed in claim 1, wherein a pivot pin connects said at least one upper middle arm to at least one lower fork arm adjacent to the tire of the single front wheel.

7. The front end device as claimed in claim 1, wherein the upper middle arm has a U-shape of which the free ends of the branches of the U-shape are articulated on the lower parts of the at least one upper fork arms below the lower fork crown, and of which the base of the U-shape is articulated on the upper end of the lower fork arm.

8. The front end device as claimed in claim 1, comprising right and left upper fork arms, fixed to two lateral ends of the upper and lower fork crowns, respectively, further comprising lower right and left fork arms arranged on opposite sides of the single front wheel, said lower right and left fork arms respectively connected to said upper right and left fork arms by said deformable parallelogram connection, said parallelogram connection comprising a single unitary upper middle arm and individual right and left lower middle arms.

9. The front end device as claimed in claim 8, wherein said individual lower middle arms are respectively arranged on opposite sides of the single front wheel.

10. The front end device as claimed in claim 9, comprising joints located at the ends of said individual right and left lower middle arms, wherein said joints are respectively arranged on the right-hand side and the left-hand side of the single front wheel, a projection of the joints of the right-hand lower middle arm on the joints of the left-hand lower middle arm, in a direction parallel to the axis of rotation of the front wheel intercepting said front wheel.

11. The front end device as claimed in claim 1, further comprising an adjustor for adjusting the distance between the points of connection of said at least one upper middle arm and said at least one lower middle arm on said at least one upper fork arm, on the one hand, and the lower fork crown, on the other hand.

12. The front end device (1) as claimed in claim 11, wherein said at least one upper fork arm has a cylindrical shape in engagement in the upper and lower fork crowns, the position where the fork crowns are fixed to said at least one upper fork arm being adjustable along at least part of the cylindrical shape.

13. The front end device as claimed in claim 12, wherein the cylindrical shape of said at least one upper fork arm has a circular cross section clamped in engagement with at least one housing formed in each of the upper and lower fork crowns, respectively, the cross-section of said housing being complementary to the circular cross section of the upper fork arm.

14. The front end device (1) as claimed in claim 3, wherein an upper end of said shock absorber is connected to the upper fork crown by a connection having at least one degree of freedom in translation, permitting an adjustable position of said upper end of the shock absorber relative to the upper fork crown.

15. A vehicle comprising multiple wheels, including one wheel supported by a front end device as claimed in claim 1.

16. The vehicle as claimed in claim 15, wherein said at least one upper middle arm and at least one lower middle arm are respectively arranged in two substantially parallel and horizontal planes when said vehicle and said front end device are in a stopped position, under the load of the weight of the vehicle.

17. The vehicle as claimed in claim 15, wherein said at least one lower fork arm is arranged in a substantially vertical plane passing through the axis of rotation of the front wheel when said vehicle and said front end device are in a stopped position, under the load of the weight of the vehicle.

18. The vehicle as claimed in claim 15, further comprising an adjustor for adjusting the distance between points of connection of said at least one upper middle arm and said at least one lower middle arm on said at least one upper fork arm, on the one hand, and the lower fork crown, on the other hand, in order to adjust the vehicle trim.

19. The vehicle as claimed in claim 15, wherein said at least one upper fork arm, said at least one lower fork arm, said at least one upper middle arm and at least one lower middle arm are connected, thereby defining said deformable parallelogram connection, whereby:
   said front end device is reconfigurable between two positions:
   a first detent position, and
   a second compressed position, and
   the wheelbase of the vehicle is substantially constant during the reconfiguration of the front end device between said two positions.

20. The front end device as claimed in claim 2, wherein the suspension comprises at least one shock absorber arranged in front of said at least one upper fork arm, wherein one lower end of the shock absorber is connected to said at least one upper middle arm.

* * * * *